United States Patent Office 3,362,298
Patented Jan. 9, 1968

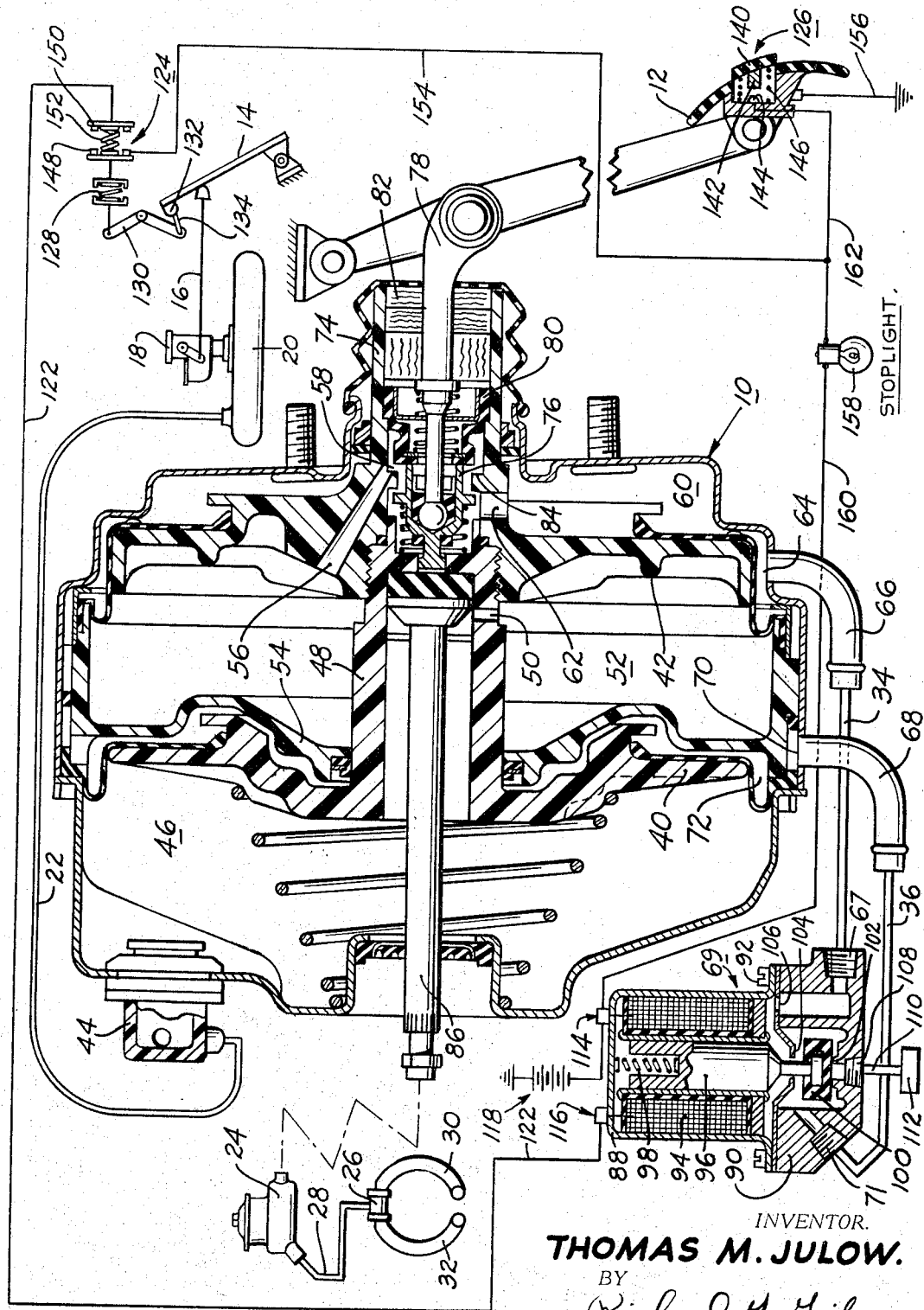

3,362,298
VEHICLE CONTROL SYSTEM
Thomas M. Julow, South Bend, Ind., assignor to The Bendix Corporation, a corporation of Delaware
Filed Oct. 18, 1965, Ser. No. 496,753
4 Claims. (Cl. 91—376)

ABSTRACT OF THE DISCLOSURE

A tandem servomotor having first and second control chambers normally operable with an electrically controlled valve controlled by switches on an accelerator pedal and a brake pedal in the vehicle so that whenever simultaneous pressure is being applied to the accelerator pedal and the brake pedal one of the movable walls in the servomotor will be actuated to create a decelerating force for the vehicle.

---

This invention relates to a means to automatically operate a control system. More particularly this invention is concerned with automatic operation of a power brake servomotor.

With the advent of power brakes for automotive vehicles which are actuated by limited brake pedal travel, certain problems have arisen because of unconscious riding of the brake pedal. It would appear there is a tendency amongst drivers of automotive vehicles to, in fact, use the brake pedal as a foot rest. In this situation pressures are developed in the master cylinder operatively connected to the power brake servomotor. This, in turn, actuates the vehicle brakes to a limited degree. One may expect this would only increase brake wear. However, one other disadvantage is more serious and that is the heat generated by continuous contact of the brake shoes and/or pads with the drums or discs, as the case may be. This heat is transferred to the brake fluid in the system and after a period of time causes the brake fluid to percolate creating a gas in the fluid system. Thereafter, actuation of the brakes by the driver will be of no avail until this gas is bled from the system. Thus, a principal object of this invention is to eliminate brake failure of this nature.

Another object of this invention is to automatically actuate a fluid pressure servomotor system whenever there is simultaneous actuation of at least two control systems, i.e., the accelerator pedal and the brake pedal of a vehicle.

Other objects and advantages will appear from the following description of one illustration with which this invention may be practiced showing a schematic system with a cross sectioned servomotor and solenoid valve means.

In more detail this illustration shows a fluid pressure motor 10 actuated by a brake pedal 12 for an automotive vehicle. The vehicle also includes an accelerator pedal 14 connected by a link 16 to a carburetor 18 scheduling fuel flow to an engine intake manifold 20.

The motor 10 is connected to the intake manifold 20 by a conduit 22 and is connected to a master cylinder 24 at its forward end. Master cylinder 24 is communicated to a wheel cylinder 26 by a line 28. The wheel cylinder, in turn, is operatively arranged to position a pair of brake shoes 30 and 32 which are located within a brake drum, not shown.

The motor 10 is shown to be of a tandem variety having a forward movable wall 40 and a rearward movable wall 42. At rest, this motor is vacuum suspended in that vacuum from manifold 20 passes through a check valve 44 into a vacuum storage chamber 46 thence through a tubular and rearward projection 48 of wall 40 to a radial passage 50 and into a second vacuum storage chamber 52 between a partition 54 and wall 42. From chamber 52 the vacuum pressure is communicated by way of passage 56 to a valve chamber 58 thence to a first control chamber 60 by way of passage 62.

To trace the flow path further, vacuum or control pressure in chamber 60 passes to a port 64 in the side of motor 10 to a hose connection 66 to which hose 34 is connected. This communicates vacuum to port 67 in a solenoid valve 69 and, so long as the valve is not electrically actuated, to a port 71 and a hose 36 to hose connection 68 and port 70 to a second control chamber 72 in motor 10.

The rear movable wall has a tubular projection 74 mounting a valve means 76 actuatable by a push rod 78 affixed to pedal 12. A flexible poppet valve 80 is affixed about its periphery to projection 74 and abutting valve means 76 to prescribe the valve chamber 58. Atmospheric pressure, therefore, is introduced through an open end 82 of projection 74 and passes internally of the poppet to the valve means which creates a pressure differential across the poppet causing the poppet to follow up the valve means until abutment with an annular valve seat 84 whereupon passage 56 is cut-off from chamber 58. Further inward motion of valve means 76 opens chamber 58 to atmospheric pressure creating a pressure differential across wall 42 and via hoses 34 and 36 and valve 69 to chamber 72 creating a similar pressure differential across wall 40. This projects a force transmitting rod 86 to activate cylinder 24. Other details of the motor construction can be observed from the copending patent application Ser. No. 416,495 assigned to the common assignee. The difference primarily between the construction of this disclosure and that one being in the use of external and/or internal valved means for communicating the control chambers.

As for the valve 69, it is constructed by bolting two portions 88 and 90 together, as at 92. It further includes an electrical solenoid formed of a coil 94 and a plunger 96 biased inwardly of the valve by a spring 98.

To the innermost end of plunger 96 is mounted a rubber valve poppet 100 that is positioned during assembly of portions 88 and 90 between seats 102 and 104, the former of which is assembled between the two portions and the latter of which is formed on portion 90.

As seen, the lower portion 90 is machined to have an upward passage 106 leading to an area above seat 104 and a lateral opening leading inwardly to the space between seats 102 and 104. Underlying seat 104, the portion 90 is formed with yet another port 108 to which a line 110 leading from a remote air filter 112 is connected.

The solenoid valve coil 94 is connected by terminals 114 and 116 to a power source 118 and a switch system by means of leads 160 and 122.

The switch means includes two normally open switch means 124 and 126. Switch 124 is connected by a spring 128 to a bellcrank 130 that is linked to the accelerator pedal 14, as at 132 by link 134. Switch 126, on the other hand, is assembled in the treadle of the brake pedal 12 and includes a pressure pad 140 mounting a contact 142 and normally spaced from another contact 144 by a spring 146. Switch 124 also includes contacts 148 and 150 separated by a spring 152.

Lead 122 is connected to contact 150 and a lead 154 connects contacts 148 and 144. Yet another lead 156 connects contact 142 to ground to complete a series connection for coil 94 to the electrical power source.

If desired, a stoplight 158, such as is common in automotive vehicles, may be connected by leads 160 and 162 to the power source 118 and switch 126, respectively. Further, yet another switch may be placed in lead 122. In this event the switch would be also of the type to be normally open and closed upon vehicle acceleration. In other words, it could be arranged to be responsive to a speedometer indication in excess, for example, of ten miles per hour or could be wind sensitive. However, by use of springs 128 and 152 liimted accelerator travel is permitted prior to close contacts 148 and 150.

In operation, the servomotor can be actuated by brake pedal 12; or when sufficient pressure is placed on pedals 12 and 14 to close respective contacts 142, 144 and 148, 150, coil 94 raises plunger 96 to close seat 104 and open seat 102. After this, a pressure differential is created across wall 40 to actuate wheel cylinder 26 via master cylinder 24. In short, if an operator rides both pedal 12 and 14 with sufficient pressure and travel, respectively, then motor 10 will pressurize master cylinder 24 to stop the automobile.

Having accomplished the objects and advantages of the invention as is readily observed by those skilled in the art to which it relates, the scope of protection sought will now be set forth by the following claims.

I claim:
1. In a control system for a fluid pressure servomotor at least one control chamber and at least one pressure chamber with said control chamber and pressure chamber being on opposite sides of said movable wall means which has a passage means operably related thereto communicated to said pressure chamber, a valve mechanism controlling said passage means and a conduit means operatively connected to said valve mechanism and communicated with said control chamber, said control system comprising:
   a first manually operable control means comprised of a first switch means sensitive to pressure on an accelerator pedal of the associated vehicle;
   a second control means comprised of a manually operable element operatively connected to said valve mechanism of the movable wall means of the servomotor and having a second switch means in series connection, via said first switch means operatively connected to the accelerator pedal, with an electrical power source; and
   valve means operatively related with said first and second switch means and said series connection for automatically actuating said servomotor means whenever said first switch and second switch are actuated as by simultaneous pressure being applied to the accelerator pedal and the manually operable control means.

2. In a control system according to claim 1 wherein said means to automatically actuate said servomotor further includes an electrical power source in series connection with said solenoid valve through the first normally open switch means operatively connected to said accelerator pedal and the second normally open switch means operatively connected to said brake pedal such that whenever said first and second switch means are closed as by simultaneous pressure on said accelerator and brake pedals said solenoid valve is energized to create a pressure differential across said second movable wall.

3. In a control system according to claim 2 wherein said first switch means includes a means to permit limited pressure on said accelerator pedal prior to closing of said switch means.

4. In a control system for a fluid pressure servomotor having a first movable wall and a second movable wall, respectively, separating said motor into first and second control chambers and first and second pressure chambers with said first control chamber and said first pressure chamber being on opposite sides of said first movable wall and said second control chamber and said second pressure chamber being on opposite sides of said second movable wall with passage means in said servomotor communicating said first and second pressure chambers and conduit means operatively connected to said servomotor communicating said first and second control chambers, said control system comprising a first manually operable control means comprised of a switch sensitive to pressure on an accelerator pedal of the associated vehicle;
   a second control means comprised of a manually operable element operatively connected to a valve mechanism within the servomotor and having a second switch means in series connection via said first switch means operatively connected to the accelerator pedal to an electrical power source; and
   valve means operatively related with said switch means and said power source in said series connection to automatically actuate said servomotor including a solenoid valve in said conduit means communicating said first and second control chambers and operative to terminate said communication and open said second control chamber to an actuating pressure source.

References Cited
UNITED STATES PATENTS

| | | | |
|---|---|---|---|
| 1,955,154 | 4/1934 | Temple | 60—52 X |
| 2,144,020 | 1/1939 | Hunt | 60—54.5 X |
| 2,507,868 | 5/1950 | Purcell | 91—459 X |
| 2,825,306 | 4/1958 | Buri | 91—459 X |
| 2,843,235 | 7/1958 | Weaver | 192—3 |
| 2,978,080 | 4/1961 | Beatty | 192—3 |
| 3,094,843 | 6/1963 | Martin | 60—54.5 |
| 3,200,914 | 8/1965 | Downs et al. | 192—3 |
| 3,207,276 | 9/1965 | David et al. | 192—3 |
| 3,232,398 | 2/1966 | Grote | 192—3 |
| 3,299,998 | 1/1967 | Douberly | 192—3 |

MARTIN P. SCHWADRON, *Primary Examiner.*

ROBERT R. BUNEVICH, *Examiner.*

UNITED STATES PATENT OFFICE
CERTIFICATE OF CORRECTION

Patent No. 3,362,298           Dated January 9, 1968

Inventor(s)           Thomas M. Julow

It is certified that error appears in the above-identified patent and that said Letters Patent are hereby corrected as shown below:

Column 3, line 20, after "servomotor" insert -- having movable wall means separating said motor into --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents